(12) United States Patent
Slates

(10) Patent No.: US 8,467,994 B2
(45) Date of Patent: Jun. 18, 2013

(54) MONITORING SYSTEM AND DISPLAY FOR USE IN A MONITORING SYSTEM

(75) Inventor: Richard Dale Slates, Minden, NV (US)

(73) Assignee: General Electric Company, Schenectady, NY (US)

( * ) Notice: Subject to any disclaimer, the term of this patent is extended or adjusted under 35 U.S.C. 154(b) by 309 days.

(21) Appl. No.: 12/892,134

(22) Filed: Sep. 28, 2010

(65) Prior Publication Data

US 2012/0078574 A1    Mar. 29, 2012

(51) Int. Cl.
*G06F 19/00* (2011.01)

(52) U.S. Cl.
USPC .......................................... 702/179

(58) Field of Classification Search
USPC .................... 702/179, 182–185, 188
See application file for complete search history.

(56) References Cited

U.S. PATENT DOCUMENTS

| | | | |
|---|---|---|---|
| 5,602,761 A | 2/1997 | Spoerre et al. | |
| 6,128,198 A | 10/2000 | Kurrer et al. | |
| 6,421,571 B1 | 7/2002 | Spriggs et al. | |
| 6,901,560 B1 | 5/2005 | Guerlain et al. | |
| 7,127,312 B2 | 10/2006 | Szoke et al. | |
| 7,600,200 B2 | 10/2009 | K et al. | |
| 2003/0144746 A1* | 7/2003 | Hsiung et al. | 700/28 |
| 2005/0144264 A1 | 6/2005 | Gruhn et al. | |
| 2009/0319232 A1 | 12/2009 | Griessler et al. | |

FOREIGN PATENT DOCUMENTS

WO    9749018 A1    12/1997

OTHER PUBLICATIONS

Search Report and Written Opinion from corresponding EP Application No. 11181450.5-1239 dated Mar. 7, 2012.

* cited by examiner

*Primary Examiner* — Edward Raymond
(74) *Attorney, Agent, or Firm* — Fletcher Yoder, P.C.

(57) ABSTRACT

A monitoring system for use in monitoring a machine includes at least one sensor for use in measuring at least one operating condition of the machine and at least one monitoring module coupled to the at least one sensor. The at least one monitoring module includes at least one display formed integrally with the monitoring module and configured to display real-time data representative of a currently measured operating condition of the machine and to display historical data representative of a previously measured operating condition of the machine such that a user is enabled to visually compare the historical data with the real-time data.

20 Claims, 3 Drawing Sheets

MONITORING SYSTEM AND DISPLAY FOR USE IN A MONITORING SYSTEM

BACKGROUND OF THE INVENTION

The present application relates generally to monitoring systems and, more particularly, to a monitoring system and a display for use in a monitoring system.

Known machines may exhibit vibrations or other abnormal behavior during operation. One or more sensors may be used to measure such behavior and to determine, for example, an amount of vibration exhibited in a motor drive shaft, a rotational speed of the motor drive shaft, and/or other suitable operational characteristics of a machine or motor. Often, the sensors are coupled to a monitoring system that includes a plurality of monitors and at least one processor. The monitoring system receives signals that are representative of measurements sensed from one or more sensors, performs at least one processing step on the signals, and then transmits the modified signals to a diagnostic platform that displays the measurements in a form that is usable by a user.

At least some known diagnostic platforms are designed to be positioned remotely from the monitors and/or the machines. As such, operators and/or technicians who may be near the monitors and/or the machines may not be able to quickly and accurately assess an operational status of the machine. Moreover, such operators and/or technicians may not be able to accurately and/or easily compare current operational characteristics of the machine's operation with prior or historical characteristics of the machine's operation.

BRIEF DESCRIPTION OF THE INVENTION

In one embodiment, a monitoring system is provided for use in monitoring a machine. The monitoring system includes at least one sensor for use in measuring at least one operating condition of the machine and at least one monitoring module coupled to the at least one sensor. The at least one monitoring module includes at least one display formed integrally with the monitoring module and configured to display real-time data representative of a currently measured operating condition of the machine and to display historical data representative of a previously measured operating condition of the machine such that a user is enabled to visually compare the historical data with the real-time data.

In another embodiment, a display system is provided for use in a monitoring system including at least one monitoring module and at least one sensor configured to measure an operating condition of a machine. The display system includes at least one display configured to be coupled with respect to the at least one monitoring module and configured to display real-time data representative of a currently measured operating condition of the machine and historical data representative of a previously measured operating condition of the machine such that a user is enabled to visually compare the historical data with the real-time data.

In yet another embodiment, a monitoring module is provided for use in a monitoring system that includes a machine and at least one sensor configured to measure at least one operating condition of the machine. The monitoring module includes at least one display formed integrally with the monitoring module and configured to display real-time data representative of a currently measured operating condition and historical data representative of a previously measured operating condition such that a user is enabled to visually compare the historical data with the real-time data.

DETAILED DESCRIPTION OF THE INVENTION

Figure 1:
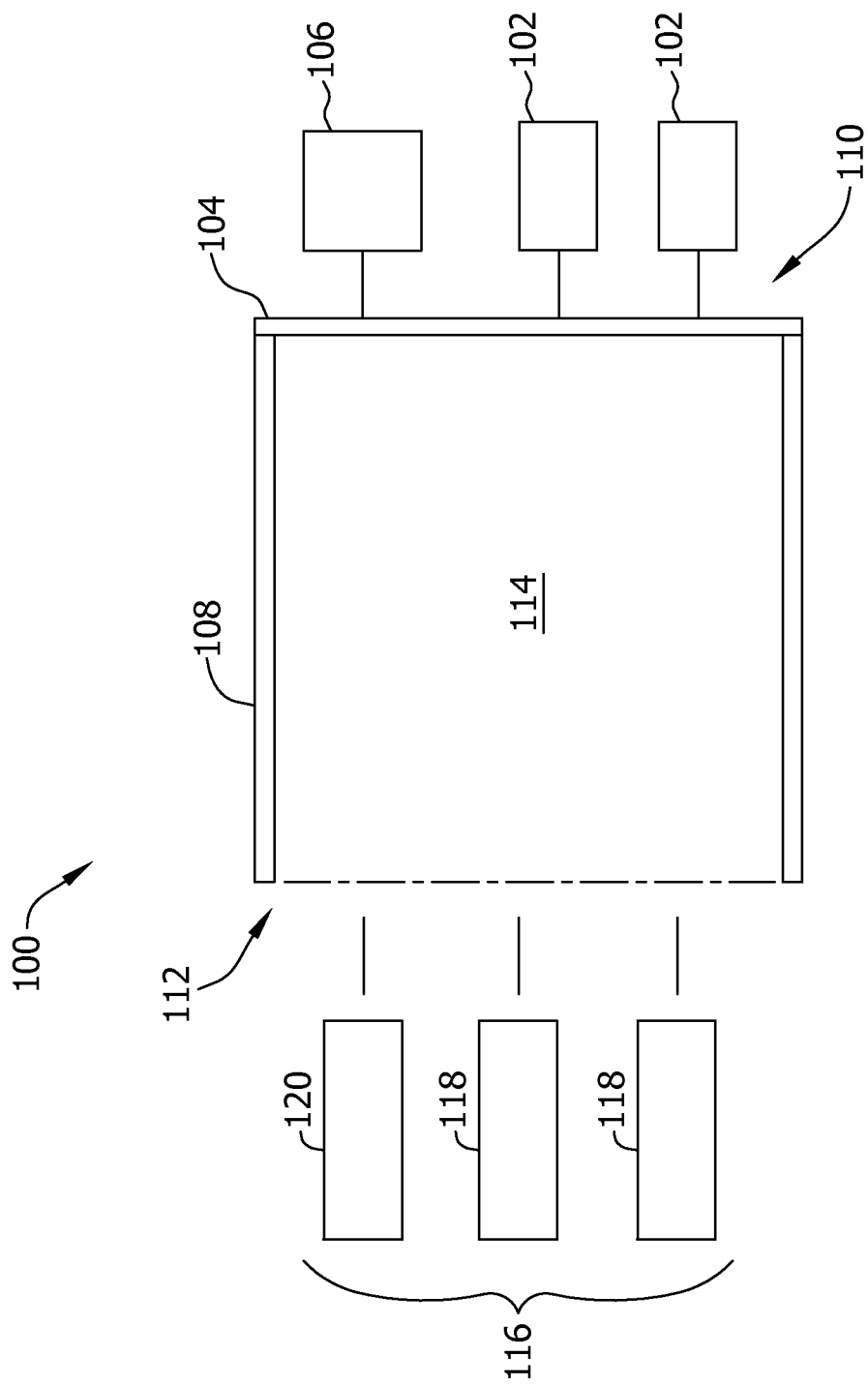
FIG. 1 is a side cross-sectional view of an exemplary monitoring system that may be used to monitor a machine.

FIG. 1 is a side cross-sectional view of an exemplary monitoring system 100 that may be used to monitor a machine (not shown). In the exemplary embodiment, monitoring system 100 monitors, detects, and/or measures at least one operating condition of at least one machine (not shown) using one or more transducers 102 or other sensors. More specifically, in the exemplary embodiment, a plurality of transducers 102 are coupled to a system backplane 104 that receives signals from transducers 102 that are representative of measured operating conditions of the machine and/or of one or more components of the machine. Moreover, in the exemplary embodiment, monitoring system 100 receives power from a power supply 106 coupled to system backplane 104. Alternatively, monitoring system 100 may receive power from any suitable power source that enables system 100 to function as described herein. As used herein, the term "couple" is not limited to a direct mechanical and/or electrical connection between components, but may also be used to include an indirect mechanical and/or electrical connection between components.

In the exemplary embodiment, system backplane 104 is positioned within a housing 108. More specifically, in the exemplary embodiment, system backplane 104 is positioned in close proximity to, or adjacent to, a rear portion 110 of housing 108. A front portion 112 of housing 108 is substantially open to an external environment. Moreover, housing 108 defines a cavity 114 that is in flow communication with and extends inwardly from front portion 112.

Monitoring system 100, in the exemplary embodiment, includes at least one monitoring module 116. More specifically, in the exemplary embodiment, monitoring system 100 includes at least one transducer monitoring module 118 that processes at least one signal received from transducers 102. As used herein, the term "process" refers to performing an operation on, adjusting, filtering, buffering, and/or altering at least one characteristic of a signal. In the exemplary embodiment, monitoring system 100 includes any number of transducer monitoring modules 118 that enables system 100 to function as described herein. Each transducer monitoring module 118 is coupled to system backplane 104 and is at least partially positioned within housing 108. As such, in the exemplary embodiment, signals from transducers 102 are transmitted to transducer monitoring modules 118 through system backplane 104. Moreover, in some embodiments, at least one signal may be transmitted between the different transducer monitoring modules 118.

In the exemplary embodiment, monitoring system 100 also includes at least one system monitoring module 120 that is coupled to system backplane 104 and is contained at least partially within housing 108. In the exemplary embodiment, system monitoring module 120 receives data and/or status signals transmitted from transducer monitoring modules 118 and/or from other components of monitoring system 100.

Module 120 processes and/or analyzes the data and/or status signals prior to transmitting the signals to a remote system (not shown), such as a computer system, for display and/or output to a user.

Figure 2:
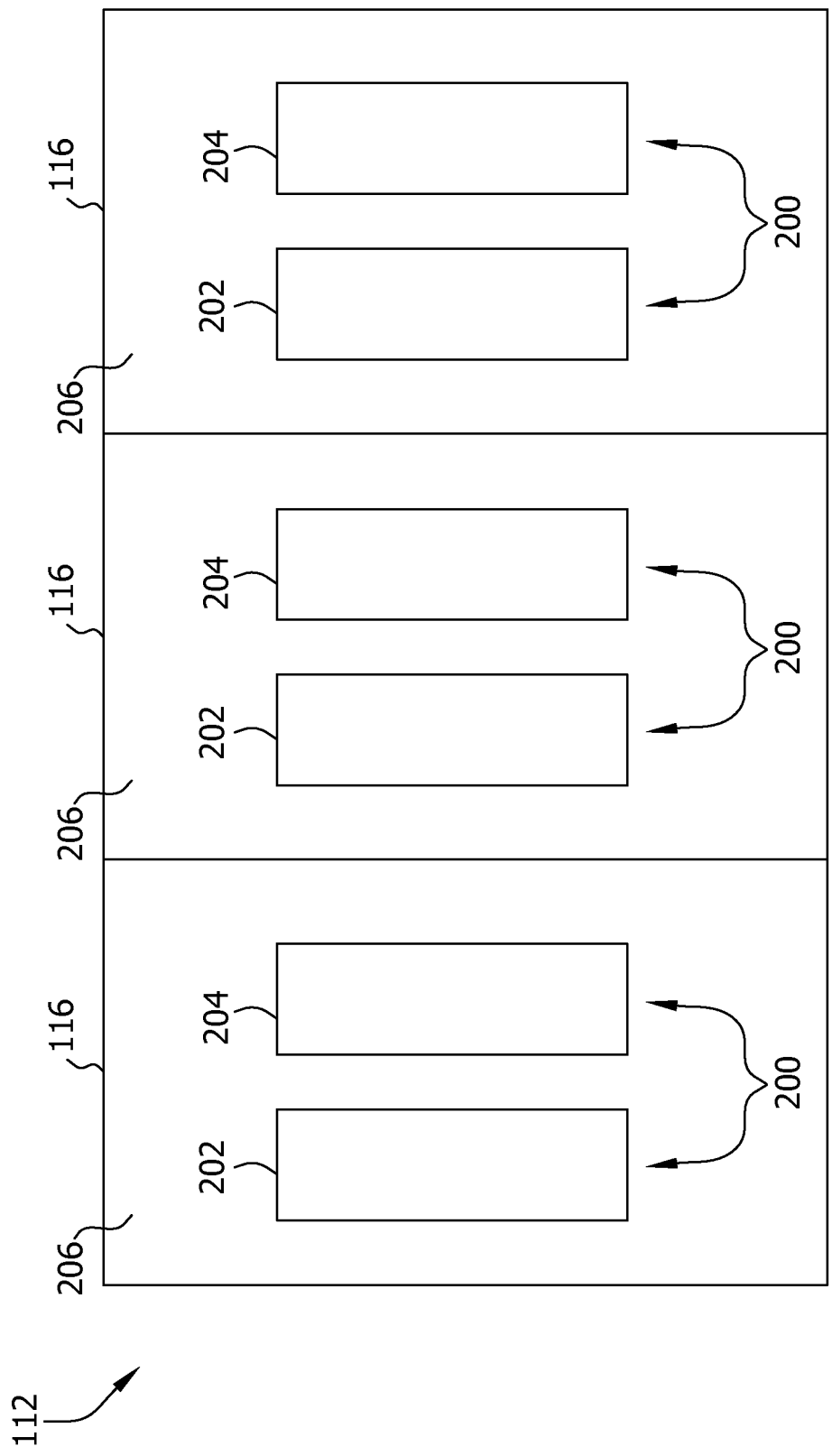
FIG. 2 is a front view of the monitoring system shown in FIG. 1.

FIG. 2 is a front view of monitoring system front portion 112. Although FIG. 2 illustrates three monitoring modules 116 positioned within front portion 112, any number of monitoring modules 116 may be positioned within front portion 112 that enables monitoring system 100 to function as described herein.

In the exemplary embodiment, each monitoring module 116 includes two displays 200. More specifically, in the exemplary embodiment, module 116 includes a first or real-time display 202, and a second or reference display 204. Each display 202 and 204 is coupled with respect to each monitoring module 116, such as coupled to, formed integrally with, and/or integrated within, a front portion 206 of each monitoring module 116. In the exemplary embodiment, reference display 204 and/or real-time display 202 may be incorporated within one or more liquid crystal display (LCD) and/or any display device (not shown) as desired. Moreover, reference display 204 and/or real-time display 202 may be displayed on a remote display device (not shown), such as a computer monitor or any other display device (not shown), that is coupled to monitoring module 116 via a cable or wirelessly. As described more fully below, in the exemplary embodiment, real-time display 202 displays real-time data received from transducers 102, and reference display 204 displays historical data previously received from transducers 102 (i.e., such as data stored in a memory device). In an alternative embodiment, each monitoring module 116 may include more or less than two displays 200 that may be positioned in any location relative to front portion 206 that enables monitoring system 100 to function as described herein. For example, in one alternative embodiment, reference display 204 is combined with real-time display 202 such that real-time data and historical data from the same transducers 102 are displayed on the same display. Accordingly, in the exemplary embodiment, a user can view and/or compare current machine data and historical machine data, e.g., on displays 202 and 204, side-by-side on a front portion 206 of each monitoring module 116 to quickly compare a current operating condition of the machine to a prior operating condition.

As used herein, the term "real-time data" refers to data, such as measurements or values sensed by transducers 102, that is received and/or displayed, substantially simultaneously at the same time the data is sensed and/or generated, disregarding minor delays for signal processing and/or transmission. As used herein, the term "historical data" refers to data, such as measurements or values previously sensed by transducers 102 that has been stored within a storage device, such as a memory device (not shown in FIG. 2). Moreover, in the exemplary embodiment, such historical data may include measurements, timing information, and/or other data that corresponds to a previous operation of a machine that has been stored in a memory device, including data received from transducers 102 and stored shortly thereafter in the memory device. Alternatively, historical data may include any data that enables monitoring system 100 to function as described herein.

In the exemplary embodiment, real-time display 202 and reference display 204 are positioned adjacent to each other (i.e., real-time display 202 is positioned horizontally to the left or to the right of reference display 204). Alternatively, real-time display 202 and reference display 204 may be positioned in any position with respect to each other relative to monitoring module 116. For example, real-time display 202 may be positioned above or below reference display 204. Moreover, in the exemplary embodiment, real-time display 202 and/or reference display 204 display real-time data and/or historical data to a user in any format that enables monitoring system 100 to function as described herein. For example, real-time data and/or historical data may be displayed in one or more charts, graphs, waveforms, tables, level indicators, lines, numerals, characters, and/or any other graphical and/or textual representation that enables monitoring system 100 to function as described herein. Moreover, real-time data and/or reference data may be displayed in a plurality of colors. For example, real-time display 202 may display real-time data in a first color or a plurality of colors if one or more measurements of the real-time data are below a predefined limit, within a predefined range, and/or if any other operating condition is satisfied.

In the exemplary embodiment, the predefined limits and/or predefined range may be equal to, and/or based on, one or more sensed measurements of the reference data and/or any other data. Real-time display 202 may display real-time data in a second color or a plurality of colors if one or more sensed measurements of the real-time data are above the predefined limit, are outside of the predefined range, and/or if any other operating condition is satisfied. In a similar manner, the reference data may be displayed in a plurality of colors. Moreover, real-time display 202 and/or reference display 204 may include one or more alarm indicators (not shown), such as a light emitting diode (LED), a strobe, a light, and/or any other alarm indicators that may be activated if one or more sensed measurements of the real-time data are above the predefined limit, are outside of the predefined range, and/or if any other condition is satisfied.

In one embodiment, one or more buttons and/or any other type of user interface (not shown in FIG. 2) may be coupled to real-time display 202 and/or to reference display 204 to enable a user to selectively switch between modes from real-time display 202 and/or reference display 204 and vice-versa and/or to switch features shown in display 202 and/or 204. For example, real-time display 202 and/or reference display 204 may be selectively switched by a user between a waveform view, a graph view, a table view, and/or any other view. Moreover, the buttons and/or the user interface may be activated to disable reference display 204.

Figure 3:
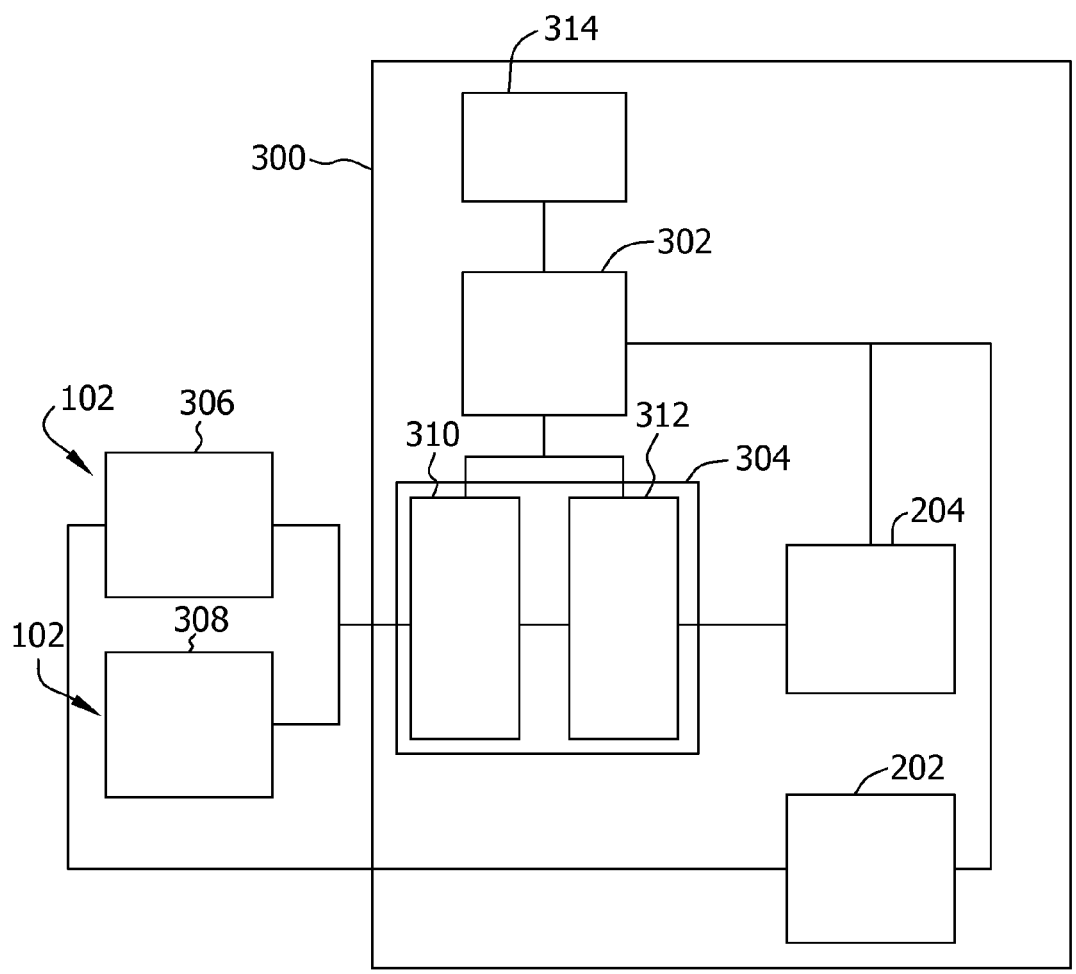
FIG. 3 is a schematic diagram of an exemplary display system that may be used with the monitoring system shown in FIG. 1.

FIG. 3 is a schematic view of a display system 300 that may be used with monitoring system 100 (shown in FIG. 1). In the exemplary embodiment, a separate display system 300 is coupled to or coupled within each monitoring module 116 (shown in FIG. 1) to control real-time display 202 and reference display 204 of each monitoring module 116. Moreover, in the exemplary embodiment, display system 300 includes a processor 302 that is coupled to a memory device 304 and to real-time display 202 and/or to reference display 204. Furthermore, at least one transducer 102, such as a first transducer 306 and/or a second transducer 308, is coupled to display system 300.

In the exemplary embodiment, processor 302 controls the operation of display system 300. Processor 302 includes any suitable programmable circuit including one or more systems and microcontrollers, microprocessors, reduced instruction set circuits (RISC), application specific integrated circuits (ASIC), programmable logic circuits (PLC), field programmable gate arrays (FPGA), and any other circuit capable of executing the functions described herein. The above examples are exemplary only, and thus are not intended to limit in any way the definition and/or meaning of the term "processor."

Memory device 304 includes, but is not limited to only including, random access memory (RAM), flash memory, a hard disk drive, a solid state drive, a diskette, a flash drive, and/or any suitable memory that enables processor 302 to store, retrieve, and/or execute instructions and/or data. In the exemplary embodiment, memory device 304 includes a first or temporary buffer 310 and a second or reference buffer 312. Alternatively, memory device 304 may include any number of buffers that enables display system 300 to function as described herein.

During operation, transducers 102 sense and/or measure desired operating conditions of a machine. For example, in the exemplary embodiment, first transducer 306 is a vibration sensor that measures an amount of vibration of a component of the machine, such as a bearing, a drive shaft (not shown), and/or any other component, and second transducer 308 is a speed sensor that measures a rotational speed of the machine, such as a rotational speed of the drive shaft. Alternatively, first transducer 306 and/or second transducer 308 may be, but is not limited to only being, a strain sensor, a temperature sensor, an acoustic sensor, and/or any other sensor that enables monitoring system 100 to function as described herein.

In the exemplary embodiment, first transducer 306 and second transducer 308 transmit signals representative of sensed operating conditions to real-time display 202 and to memory device 304. In one embodiment, signals from first transducer 306 and/or second transducer 308 are filtered, amplified, and/or digitized before the signals are transmitted to real-time display 202 and/or to memory device 304. Moreover, in the exemplary embodiment, real-time display 202 displays one or more values and/or other usable representations of the signals to a user. More specifically, in the exemplary embodiment, display 202 displays current (i.e., real-time) values of the sensed operating conditions. For example, in the exemplary embodiment, real-time display 202 displays a current speed and a current vibration amplitude of one or more components of at least one machine.

Moreover, in the exemplary embodiment, memory device 304 stores the sensed values received from first transducer 306 and from second transducer 308 in temporary buffer 310. More specifically, in the exemplary embodiment, memory device 304 continuously stores the sensed values from the time the machine commences operation until the machine reaches steady state operation. Such a time period is hereinafter referred to as the "machine start-up period." Alternatively, memory device 304 may be configured to continuously store the signal values during the entire time period the machine is operating, or during any other time period or time periods desired by the user.

In the exemplary embodiment, the sensed or signal values are associated with each other and/or are time-stamped using a signal received from a clock unit (not shown). Moreover, in the exemplary embodiment, values representative of the measured rotational speed of the machine (hereinafter referred to as the "speed values") and values representative of the measured amount of vibration in the machine (hereinafter referred to as the "vibration values") are stored in an array or another data structure within temporary buffer 310. The speed values and the vibration values remain in temporary buffer 310 until processor 302 transfers the values to reference buffer 312 for storage as historical or reference values (described above in reference to FIG. 2). If the speed values and/or the vibration values are not transferred into reference buffer 312, the values in temporary buffer 310 may be overwritten with speed values and/or vibration values received during a later time period. As used herein, the term "transfer" encompasses copying values to a destination without deleting the values from a source after copying, as well as copying the values to the destination and deleting the values from the source after the values have been copied.

In one embodiment, one or more historical or reference values, such as one or more historical speed values and/or vibration values, may be received from a remote source, such as from another machine, another monitoring system, a remote computer, and/or a remote storage device. In such an embodiment, processor 302 and/or a remote processor transfers the speed values, vibration values, and/or any other values into reference buffer 312 when a predefined condition is satisfied, as is more fully described below.

In the exemplary embodiment, processor 302 transfers the speed values and/or the vibration values to reference buffer 312 when at least one predefined condition is satisfied. For example, processor 302 may transfer the speed values and/or the vibration values when a user inputs an appropriate command into processor 302 via a user interface 314 or any other interface that enables monitoring system 100 to function as described herein. Alternatively, processor 302 may automatically transfer the speed values and/or the vibration values to reference buffer 312 if reference buffer 312 is empty (i.e., if no other values have been stored within reference buffer 312), after an initial startup of the machine (e.g., after the machine start-up period has completed), and/or if any other predefined condition is satisfied.

Moreover, in the exemplary embodiment, processor 302 performs at least one operation on the speed values and/or the vibration values that are stored in temporary buffer 310 and/or that are received from first transducer 306 and/or second transducer 308. For example, a plurality of vibration values may be associated with each speed value, such as if the machine increases a rotational speed slowly as compared to the sampling rate of transducers 102. Processor 302 may calculate a minimum value, a maximum value, a mean value, a median value, and/or any other value for the plurality of vibration values associated with a particular speed value. In the exemplary embodiment, processor 302 transmits the minimum value, the maximum value, the mean value, and/or the median value of the vibration values associated with each speed value to temporary buffer 310 for storage in buffer 310. Moreover, in the exemplary embodiment, processor 302 transfers the calculated values, along with the speed values and the vibration values, to reference buffer 312 when at least one predefined condition is satisfied, as described more fully above. Alternatively, to reduce memory storage requirements, only one or more calculated values may be stored in temporary buffer 310 and/or reference buffer 312, rather than the speed values and/or the vibration values.

In the exemplary embodiment, one or more of the values stored in reference buffer 312 are automatically displayed on reference display 204. Alternatively, one or more of the values stored in reference buffer 312 are displayed on reference display 204 when reference display 204 is activated by the user and/or when any other predefined condition is satisfied. More specifically, in the exemplary embodiment, reference display 204 receives the current speed value of the machine from second transducer 308. Reference display 204 references the current speed value in the list of values stored in reference buffer 312 and displays the maximum value, the minimum value, and/or the median value of the vibration signal that corresponds to the current speed value. Alternatively, any other value may be displayed based on the current speed value and/or based on any other value that enables monitoring system 100 to function as described herein.

Moreover, in one embodiment, processor 302 compares at least one real-time value with at least one historical value and/or at least one of the calculated values, such as the minimum value, the maximum value, the mean value, and/or the median value of the historical data. Processor 302 may adjust real-time display 202 and/or reference display 204 if the real-time value deviates from at least one calculated value by a predefined amount, such as by a predefined value, by a predefined percentage of the calculated value and/or the real-time value, and/or by any other amount that enables display system 300 to function as described herein. Moreover, processor 302 may adjust real-time display 202 and/or reference display 204 by directing displays 202 and/or 204 to display the real-time data and/or the historical data in one or more colors, fonts, lighting conditions, and/or any other display characteristic based on the comparison of real-time values with the calculated values and/or historical values.

As described herein, first transducer 306 is a vibration sensor that generates one or more vibration values, and second transducer 308 is a speed sensor that generates one or more speed values. However, it should be recognized that this description is exemplary only and should not be read to limit first transducer 306 and/or second transducer 308. Rather, monitoring system 100 may use any other number of transducers and any suitable type of transducer that enables monitoring system 100 to function as described herein.

Moreover, as described herein, monitoring system 100 enables at least one operating condition of at least one machine to be quickly and accurately determined. More specifically, a user can view current machine data (using real-time display 202) and historical machine data (using reference display 204) side-by-side on a front portion 206 of each monitoring module 116 to compare a current operating condition of the machine to a prior operating condition. In contrast, at least some known prior art systems only enable a user to view current machine data and/or historical machine data at a remote location, such as at a remote computer system. Accordingly, and in contrast to prior art systems, monitoring system 100 provides a convenient and effective way for a user, such as an operator or a technician on a machine floor, to quickly compare a current operation of the machine to a prior operation.

The monitoring system and display system described herein enable a user to quickly and efficiently assess one or more operating conditions of a monitored machine. A real-time display presents one or more measurements of real-time operating conditions to a user for viewing. A reference display presents one or more measurements of historical operating conditions to the user. The user may visually compare the real-time operating conditions and the historical operating conditions to quickly determine how a current operation of the machine compares to a previous operation of the machine or of another machine. As such, the display system provides a more robust depiction of the operation of the machine as compared to known display systems that may only depict a current operation of the machine.

A technical effect of the systems and apparatus described herein includes at least one of (a) measuring at least one operating condition of a machine, (b) displaying at least one real-time value representative of at least one operating condition of a machine; (c) storing at least one historical value representative of a previous measured operating condition of a machine, (d) calculating at least one of a maximum value, a minimum value, and a median value of a signal, and (e) displaying at least one real-time value and at least one historical value on at least one display.

Exemplary embodiments of a monitoring system and a display system for use in a monitoring system are described above in detail. The monitoring system and/or display system are not limited to the specific embodiments described herein, but rather, components of the systems may be utilized independently and separately from other components described herein. For example, the display system may also be used in combination with other measuring systems, and is not limited to practice with only the monitoring system as described herein. Rather, the exemplary embodiment can be implemented and utilized in connection with many other power system applications.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A monitoring system for use in monitoring a machine, said monitoring system comprising:
   at least one sensor for use in measuring at least one operating condition of the machine; and
   at least one monitoring module coupled to said at least one sensor, said at least one monitoring module comprising at least two separate displays formed integrally with monitoring module, wherein at least a first display is configured to
   display real-time data representative of a currently measured operating condition of the machine; and
   wherein at least a second display is configured to display historical data representative of a previously measured operating condition of the machine such that a user is enabled to visually compare the historical data with the real-time data.

2. A monitoring system in accordance with claim 1, wherein at least one of said at least two displays is coupled to a front portion of said at least one monitoring module such that the real-time data is displayed adjacent to the historical data.

3. A monitoring system in accordance with claim 1, further comprising a user interface configured to enable a user to selectively vary the display of the historical data.

4. A monitoring system in accordance with claim 1, wherein said at least one monitoring system further comprises:
   a temporary buffer configured to store historical data received from said at least one sensor; and
   a reference buffer coupled to said temporary buffer and configured to receive historical data from said temporary buffer when a predefined condition is satisfied.

5. A monitoring system in accordance with claim 4, wherein said reference buffer is configured to receive historical data from said temporary buffer based on at least one of a user input, a status of said reference buffer, and a status of the machine startup.

6. A monitoring system in accordance with claim 4, wherein said at least two displays comprise:

a first display coupled to said at least one sensor, said first display configured to display the real-time data; and a second display coupled to said reference buffer, said second display configured to display the historical data.

7. A monitoring system in accordance with claim 1, wherein said at least one monitoring module further comprises a processor coupled to at least a first of said at least two separate displays, said processor configured to calculate at least one of a maximum value, a minimum value, a mean value, and a median value of the at least one historical value, said at least a first of said at least two separate displays is further configured to display at least one of the calculated values.

8. A monitoring system in accordance with claim 7, wherein said processor compares the real-time data with at least one of the calculated values, said at least a first of said at least two separate displays automatically adjusts the display of the real-time data if the real-time data deviates from the at least one of the calculated values by a predefined amount.

9. A display system for use in a monitoring system including at least one monitoring module and at least one sensor configured to measure an operating condition of a machine, said display system comprising:

at least two separate displays, wherein at least a first display is configured to be coupled with respect to the at least one monitoring module and configured to
display real-time data representative of a currently measured operating condition of the machine; and
wherein at least a second of said at least two displays is configured to display historical data representative of a previously measured operating condition of the machine such that a user is enabled to visually compare the historical data with the real-time data.

10. A display system in accordance with claim 9, wherein at least one of said at least two displays is coupled to a front portion of the at least one monitoring module such that the real-time data is displayed adjacent to the historical data.

11. A display system in accordance with claim 9, further comprising a user interface configured to selectively vary the display of the historical data.

12. A display system in accordance with claim 9, further comprising:

a temporary buffer configured to store the historical data; and a reference buffer configured to receive historical data from said temporary buffer when a predefined condition is satisfied.

13. A display system in accordance with claim 12, wherein said reference buffer is configured to receive historical data from said temporary buffer based on at least one of a user input, a status of said reference buffer, and a status of the machine startup.

14. A display system in accordance with claim 12, wherein said at least two displays comprise:

a first display coupled to the at least one sensor, said first display configured to display the real-time data; and a second display coupled to said reference buffer, said second display configured to display the historical data.

15. A display system in accordance with claim 9, further comprising a processor coupled to at least a first of said at least two separate displays, said processor configured to calculate at least one of a maximum value, a minimum value, a mean value, and a median value of the at least one historical value, said at least a first of said at least two separate displays is further configured to display at least one of the calculated values.

16. A display system in accordance with claim 15, wherein said processor compares the real-time data with at least one of the calculated values, said at least a first of said at least two separate displays automatically adjusts the display of real-time data if the real-time data deviates from the at least one of the calculated values by a predefined amount.

17. A monitoring module for use in a monitoring system that includes a machine and at least one sensor configured to measure at least one operating condition of the machine, said monitoring module comprising:

at least two separate displays formed integrally with said monitoring module, wherein at least a first display is configured to
display real-time data representative of a currently measured operating condition; and
wherein at least a second display is configured to display historical data representative of a previously measured operating condition such that a user is enabled to visually compare the historical data with the real-time data.

18. A monitoring module in accordance with claim 17, further comprising a processor coupled to at least a first of said at least two separate displays, said processor configured to calculate at least one of a maximum value, a minimum value, a mean value, and a median value of the at least one historical value, said at least a first of said at least two separate displays is further configured to display at least one of the calculated values.

19. A monitoring module in accordance with claim 17, further comprising:

a temporary buffer configured to store historical data received from the at least one sensor; and a reference buffer configured to receive historical data from said temporary buffer when a predefined condition is satisfied.

20. A monitoring module in accordance with claim 19, wherein said at least two displays comprise:

a first display coupled to the at least one sensor, said first display configured to display the real-time data; and a second display coupled to said reference buffer, said second display configured to display the historical data.

* * * * *